United States Patent
Ertan

(10) Patent No.: US 9,276,487 B2
(45) Date of Patent: Mar. 1, 2016

(54) POWER-LEVEL WAVEFORM GENERATION METHOD

(76) Inventor: Bulent Hulusi Ertan, Ankara (TR)

( * ) Notice: Subject to any disclaimer, the term of this patent is extended or adjusted under 35 U.S.C. 154(b) by 133 days.

(21) Appl. No.: 13/980,840

(22) PCT Filed: Jan. 21, 2011

(86) PCT No.: PCT/TR2011/000009
§ 371 (c)(1),
(2), (4) Date: Jul. 19, 2013

(87) PCT Pub. No.: WO2012/099551
PCT Pub. Date: Jul. 26, 2012

(65) Prior Publication Data
US 2013/0301316 A1    Nov. 14, 2013

(51) Int. Cl.
*H02M 5/45* (2006.01)
*H02M 5/458* (2006.01)
*H02M 5/293* (2006.01)
*H02M 7/48* (2007.01)
*H02M 1/00* (2007.01)

(52) U.S. Cl.
CPC .............. *H02M 5/458* (2013.01); *H02M 5/293* (2013.01); *H02M 7/48* (2013.01); *H02M 2001/007* (2013.01); *H02M 2001/0048* (2013.01); *Y02B 70/1491* (2013.01)

(58) Field of Classification Search
CPC ....................................................... H02M 5/458
USPC ...................................... 363/34–37
See application file for complete search history.

(56) References Cited

U.S. PATENT DOCUMENTS

| | | | |
|---|---|---|---|
| 7,109,659 B2 * | 9/2006 | Kamoi | H05B 41/2928 315/291 |
| 8,208,235 B2 * | 6/2012 | Orchowski | 361/88 |
| 2005/0074665 A1 * | 4/2005 | Spaziante et al. | 429/50 |
| 2007/0035975 A1 * | 2/2007 | Dickerson | H02J 7/35 363/131 |
| 2008/0018265 A1 * | 1/2008 | Lee et al. | 315/291 |
| 2010/0289423 A1 * | 11/2010 | Yao | H05B 41/2825 315/246 |

* cited by examiner

*Primary Examiner* — Timothy J Dole
*Assistant Examiner* — Htet Z Kyaw
(74) *Attorney, Agent, or Firm* — Gokalp Bayramoglu

(57) ABSTRACT

The present invention relates to a method of generating various alternating current waveforms, at power level. The AC mains power supply is rectified, processed by various circuits, controlled by a control unit and inverted as required at the output. This method may be employed with converter isolation from the mains. It is also possible to employ the system so that the input current is sinusoidal and the power factor of the converter is unity. The present invention produces preferably the sinusoidal output waveform with fundamental component at the desired frequency, where this waveform is produced employing a DC bus from which output voltage with the fundamental component at the desired shape and frequency is obtained using pulse width modulation techniques. The output stage is simply an inverter which inverts this waveform at zero-crossings of the rectified waveform to obtain an AC output.

6 Claims, 4 Drawing Sheets

POWER-LEVEL WAVEFORM GENERATION METHOD

TECHNICAL FIELD OF THE INVENTION

The present invention relates to a method and a system; capable of generating various alternating current waveforms or other waveforms, at power level. The input current from the AC mains power supply is rectified, processed by intermediate stages controlled by a control unit and inverted as required at the output. This method may be employed with converter isolation from the mains. It is also possible to employ the system so that the input current is sinusoidal and the power factor of the converter is unity.

BACKGROUND OF THE INVENTION

In modern industrial applications, synthesizing a sinusoidal output waveform at a desired frequency and voltage has become an important issue. The power levels can be a few watts to megawatts depending on the application. This is achieved by a converter type called "inverter". Inverters are used for uninterruptible power supply applications, or for driving motors in variable speed AC drives. Present technology for producing a power-level sinusoidal output source, generally relies on one of the two solutions, briefly described below;
  a) A DC bus is created and via "pulse width modulation" techniques, a pulsed output waveform at the desired frequency is created. The modulation technique employed is such that the pulsed output waveform has a fundamental frequency component at the desired voltage level. Sometimes a filter is employed to eliminate the undesirable voltage harmonics in the synthesized waveform. The filter naturally caries the load current and can be bulky. If these voltage harmonics do not harm the function of the load, and in case the load is inductive the filter may be omitted; the inductance of the load assures that the current drawn by the load has low distortion and hence, sinusoidal shape.
  Alternatives are available based on the fundamental idea above. These may be found in many patents, papers and books available in the market.
  b) Alternatively the 3-phase mains supply is used to generate a sinusoidal output directly with the aid of devices so called "cycloconverters". This solution however requires an expensive power stage and is only suitable for low-frequency high-power applications.

An important requirement in many applications is reduced converter size and if possible reduced cost. Furthermore, pulsed output waveform of conventional inverters is undesirable in motor drive applications. The pulsed waveform causes stresses on the insulation. Also harmonics of the waveform cause additional power losses in the motor and this reduces the efficiency. For that reason, most motors operating with pulsed output waveforms are derated in operation. This situation occurs also for single phase motors, especially when the motor employed is of capacitor start or run type.

Another desirable feature in modern inverters is assuring that input power factor is high and high frequency harmonics are not generated towards the mains side.

The industry therefore needs a converter which is capable of;
  drawing a sinusoidal current from the mains at unity power factor,
  which provides isolation of the load and the mains supply, generates a smooth sinusoidal voltage of desired magnitude at the desired frequency, For these reasons it is desirable to have an inverter topology overcoming the problems of the present technology, i.e.; producing a smooth output waveform with high efficiency and compact size.

The present invention here is capable of addressing all of the problems discussed in the above paragraphs and provides a solution which meets the requirements mentioned.

BRIEF DESCRIPTION OF THE INVENTION

The present invention differs from the prior art in producing preferably the sinusoidal output waveform in that; it does not have a pulsed output waveform, with fundamental component at the desired frequency, where this waveform is produced employing a DC bus from which output voltage with the fundamental component at the desired shape and frequency is obtained using pulse width modulation techniques.

In the invention here; essence of the proposed method is to create a DC bus which has a full-wave rectified sinusoidal waveform (or any desired waveform) using switched mode DC to DC converters or by some other means. The output stage is simply an inverter which inverts this waveform at zero-crossings of the full-wave rectified waveform to obtain an AC output. In this manner, the output stage employs inexpensive transistors operating at the output frequency. As a result the switching loss and the heat sink size are smaller.

All these factors help to obtain a high efficiency and smaller size converter, not possible with the existing technology. A cost advantage is also obtained.

Furthermore, since the output of the converter is not composed of pulses, it does not cause harmful currents to flow through the stray capacitances of the load. Hence the insulation life is not shortened, as often encountered when converters in the state of the art are used. There is no need to filter the output which also helps to reduce converter size.

Final stage of the converter (FIG. 1, 6), is simply responsible for inverting the waveform on the full-wave rectified DC bus (FIG. 1, 10). The switching frequency of the switches of this stage is at the output frequency and furthermore, they operate at zero crossings of the waveform. Therefore the switching loss is very low as compared to the inverter switches employed in the state of the art. Combined with their low operating frequency, the switching losses of the inverter stage of the present invention is very low, improving overall efficiency of the converter, as compared to similar devices employing prior art. Because of the low switching loss, the need for cooling is also reduced. This reduces the size of the heat sink, which is one of the costliest items employed in converters.

The technology described here may be employed in various modes, depending on the requirements of the application. It may be used to obtain a unity power factor, sinus input current converter.

If desired, electrical isolation of the input and output stages can also be possible (FIGS. 3 and 4). The isolation can be achieved using a transformer designed for operation at mains frequency as it is done in the present technology. Alternatively if there are size concerns, a high frequency transformer may be employed by introducing an intermediate stage.

It is also possible to employ the proposed invention so that all of the desired features are achieved in a very compact device (FIG. 4), which has Unity Power Factor input, electrical isolation and variable or constant frequency output.

The present invention may be employed for achieving three-phase motor drives or three-phase "uninterruptible power supply" (UPS) converters by employing a commonly controlled three single-phase units.

The implementation of the proposed topology is not costlier than the present technology converters.

DEFINITION OF THE FIGURES

The features of the present invention are set forth particularly in the appended claims. Further objects, features and advantages of the invention for generation of power-level sinusoidal output (or any other waveform) will be explained in the following description, relating to examples of preferred and explanatory, but non-limiting schematic drawings, such that:

Figure 1:
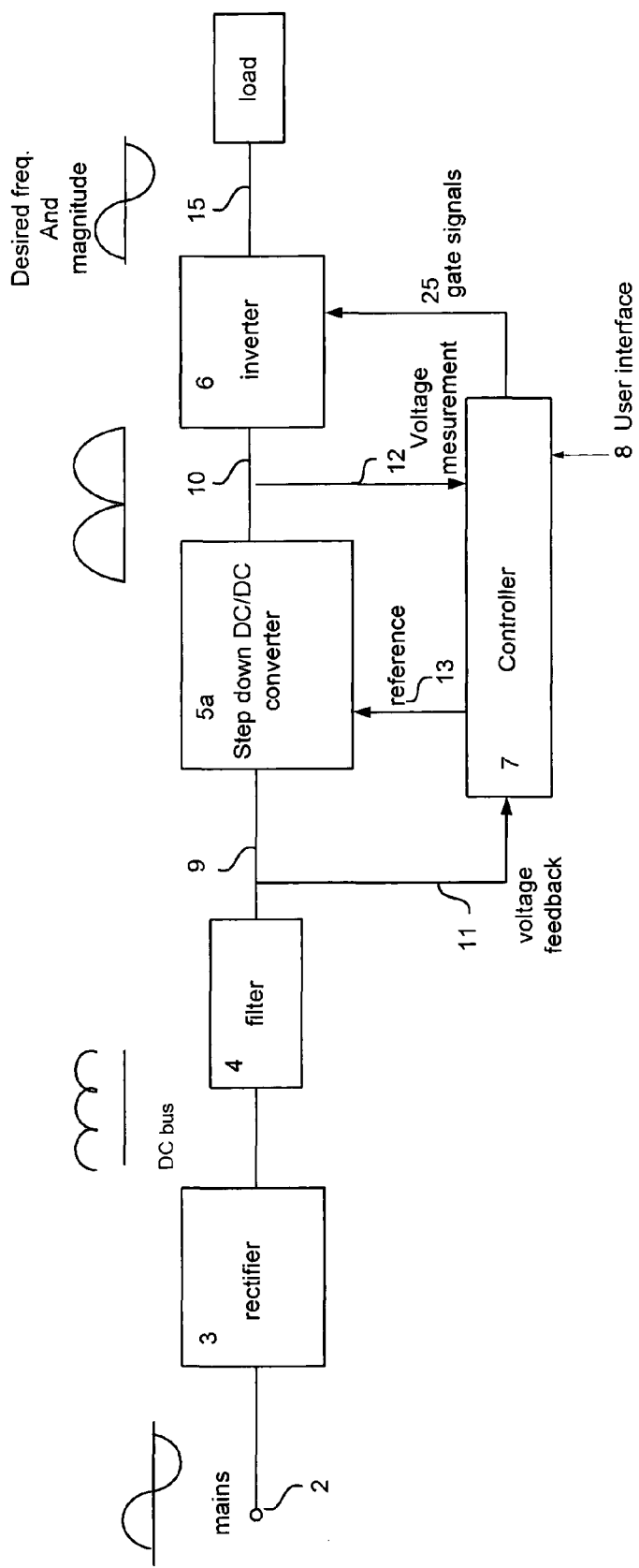
FIG. 1 is a functional block diagram of a non-isolated, converter employing the invention, which has mains AC input (2) and variable frequency and amplitude AC output (15) where the input current is non-sinusoidal.

In order to explain the invention, the parts and pieces shown in the figures have been separately numbered and each part has been described below.

2. AC mains
3. Rectifier
4. Filter
5a. DC to DC step-down converter
5b. DC to DC converter with isolation
5c. DC to DC step-down converter with isolation
6. Inverter
7. Controller
8. User interface
9. DC bus
10. Full-wave rectified bus
11. DC bus feedback signal
12. Full-wave rectified DC bus feedback signal
13. Reference signal
14a. Step-down DC to DC converter gate control signal
14b. DC to DC converter with isolation gate control signal
14c. Step-down DC to DC converter with isolation gate control signal
15. AC output
21. Step-up DC to DC converter
22. Regulated DC bus
23. Regulated DC bus feedback signal
24. Step-up DC to DC converter gate control signal
25. Inverter gate control signal
41. Synchronous buck converter
42. Intermediate regulated DC bus
43. Intermediate regulated DC bus feedback signal
44. Synchronous converter gate control signal

DETAILED DESCRIPTION OF THE INVENTION

The waveform generation method for generating a desired waveform, according to the present invention, generally comprises the steps:

rectifying AC input,
processing the rectified waveform; where the processed waveform is the full-wave rectified form of the desired waveform,
and inverting the processed waveform at zero-crossings.

A possible but not exclusive block diagram for the basic waveform generation system is shown in FIG. 1. The system includes a rectifier (3) on the input side, a DC to DC step-down converter (5a) and an inverter (6) for DC to AC conversion. The waveform generation method for generating a desired waveform, according to this basic embodiment of the present invention comprises the steps:

rectifying AC input,
processing the rectified input; where, in order to produce the rectified form of the desired waveform, the rectified AC input is processed by a DC to DC step-down converter (5a), which provides full-wave rectified sinusoidal waveform or any desired waveform,
and inverting the processed waveform at zero-crossings.

FIG. 1 presents a possible block diagram representation of a waveform generation system according to an embodiment of the invention. In this Figure, rectifier (3) rectifies the from the AC mains (2). A filter (4) may be used to obtain a current on a DC bus (9) with the desired ripple level. The current on the DC bus (9) provides power to the DC to DC step-down converter (5a). The DC to DC step-down converter (5a) receives a reference signal (13) from the controller (7), which controls the shape, the magnitude and the frequency of its output. The controller (7) may receive a full-wave rectified DC bus voltage feedback signal (12) from the full-wave rectified DC bus (10), in order to adjust the duty cycle of the DC to DC step-down converter (5a) so as to assure that the output, the full-wave rectified bus (10) traces the reference signal (13) well. The internal frequency of the DC to DC step-down converter (5a) is chosen according to the power level and the desired efficiency or based on any desired criteria. Finally, the inverter (6) of the block diagram inverts the full-wave rectified waveform at zero crossings of the full-wave rectified bus (10) voltage. The controller (7) receives a full-wave rectified DC bus feedback signal (12) from the bus (10) and decides on the switching instants of the inverter (6) transistors and sends gate signals to the inverter (25). As a consequence, an AC voltage output (15) is obtained, which is a sinusoidal waveform at the desired voltage magnitude and frequency. Note that bus (10) may carry any waveform specified by the user via a user interface (8) connection.

The blocks mentioned above can be implemented in many ways, based on the converter specifications for a given application.

Another embodiment of the waveform generation method for generating a desired waveform according to the present invention, which accommodates sinusoidal input, comprises the steps:

rectifying AC input,
processing the rectified input; where, in order to produce the rectified form of the desired waveform, the rectified AC input is processed by a step-up DC to DC converter (21) which provides accommodation of sinusoidal input, followed by a DC to DC step-down converter (5a), which provides full-wave rectified sinusoidal waveform or any desired waveform,
and inverting the processed waveform at zero-crossings.

Figure 2:
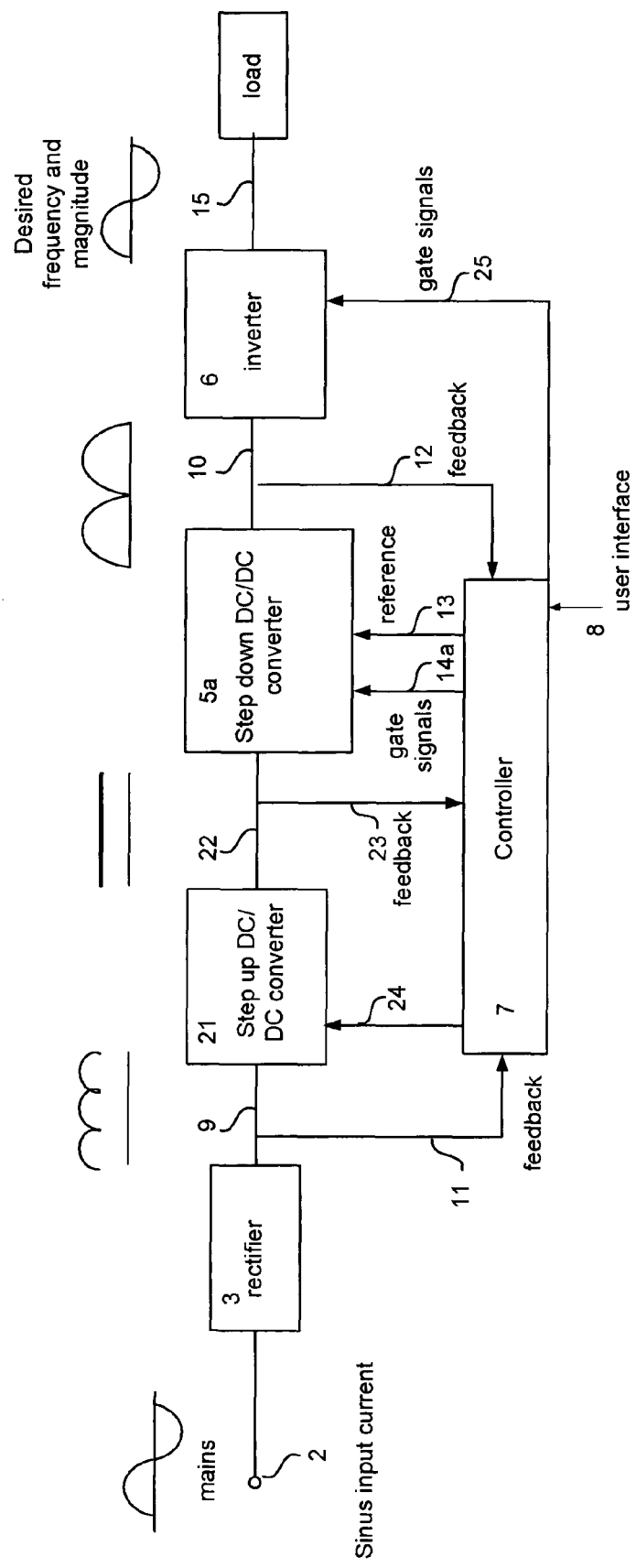
FIG. 2 is a functional block diagram of an inverter employing the invention, where the input current to the converter is at unity power factor and sinusoidal on the mains side (2) and the AC output (15) of the converter has variable frequency and amplitude. There is no isolation in this case.

Accordingly, if unity power factor, sinusoidal input current is desired, a waveform generation system as depicted in FIG. 2 may be employed. In this case, first the AC mains (2) is rectified by a diode rectifier (3) and a DC bus with some ripple on the waveform is achieved at the DC bus (9). A DC to DC step-up converter (21) follows the rectifier (3). This stage is responsible for achieving UPF (unity power factor) operation and drawing a sinusoidal input current from the mains. This is achieved by the controller (7) which has appropriate DC bus feedback signals (11) from the rectified DC bus (9) and the mains voltage (2) as well as regulated DC bus feedback signals (23) from a regulated DC bus (22) connected to the output of the step-up converter (21); adjusting the step-up converter gate control signals (24) for the DC to DC step-up converter's (21) switching devices.

Note that the controller (7) may be connected to a user interface (8) providing a user input relating to the preferences of the user. The user may provide information on the load requirements, regulated DC bus (22) voltage level or any other desired information to facilitate control of the step-down converter's (5a) input and output.

On the full-wave rectified bus (10) side, this step-down converter (5a) generates a regulated DC output at the level set by its reference signal (13) provided by the controller (7). Note that the step-up converter (21) here is very useful as it maintains the DC bus (9) at a constant voltage level; hence the control of the succeeding step-down converter (5a) stage output becomes easier. Furthermore the step-up converter (21) stage may be used to increase the DC bus (9) voltage level so that; even if the input AC voltage level drops the output of the step-up converter (21) can be maintained at the desired level.

The step-down DC to DC converter (5a) receives a step-down DC to DC converter gate control signal (14a) so that its output has the desired output waveform. The controller (7) decides on the shape, frequency and magnitude of the reference by making calculations using the regulated DC bus feedback signals (23) from the regulated DC bus (22) and the user interface (8); thus the reference signal (13) is generated. The output may be a full-wave rectified sinusoidal shape of desired magnitude and frequency at DC the full-wave rectified bus (10). The converter system can be used to produce any waveform specified by the user, in a similar manner to that described for achieving a sinusoidal output.

The step-down converter (5a) is followed by an inverter (6) stage which has low frequency, low cost transistors. The inverter (6) inverts the full-wave rectified bus (10) voltage. The inverter's (6) transistors switch at the zero crossings of the full-wave rectified bus (10) voltage. The inverter gate control signals (25) for this purpose are generated by the controller (7). The controller obtains a full-wave rectified DC bus feedback signal (12) from the full-wave rectified bus (10) voltage and other feedbacks as desired.

Figure 3:
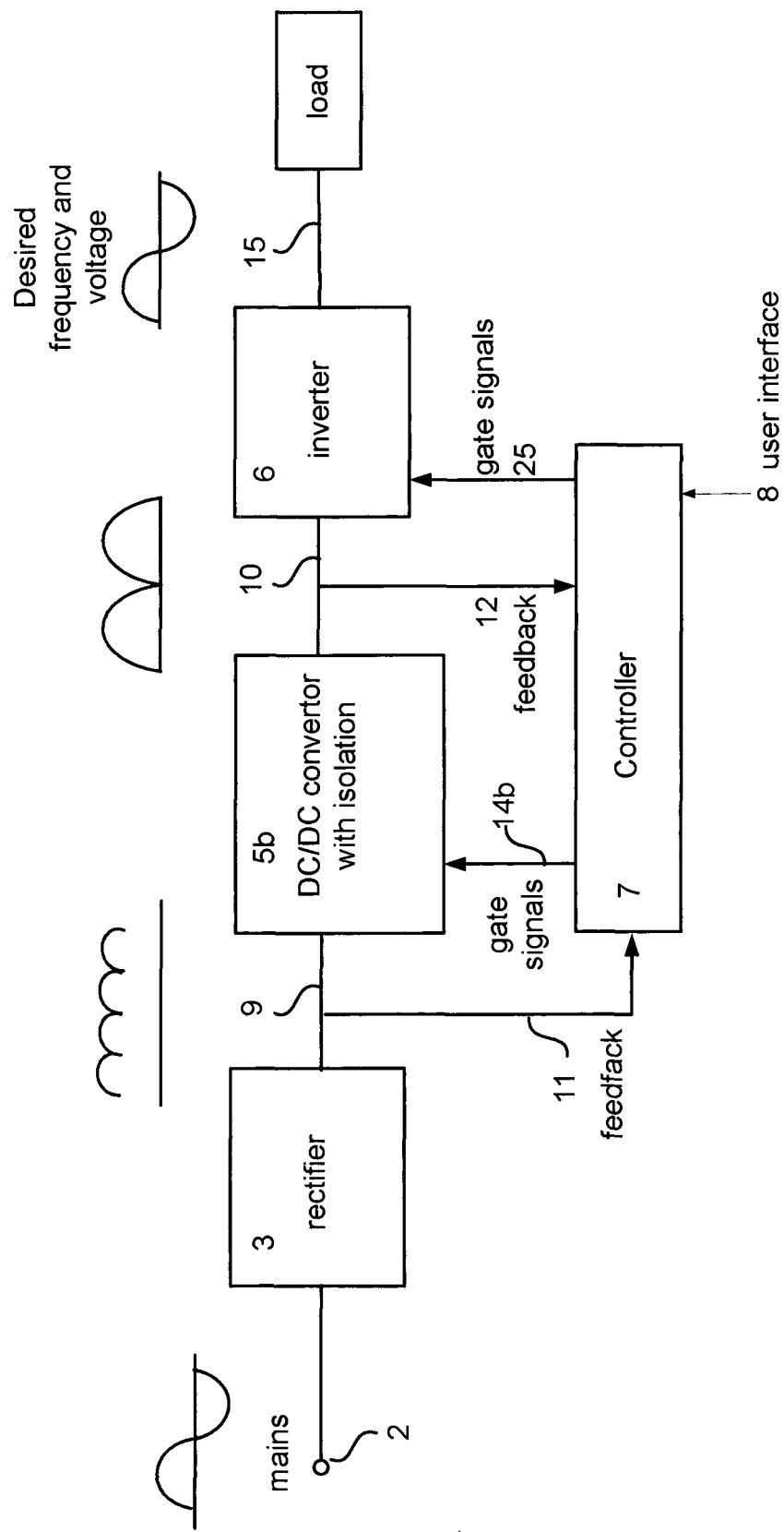
FIG. 3 is a functional block diagram of an inverter employing the invention with isolation, which has mains voltage as AC input (2) and has a variable frequency and amplitude AC output (15) where the input current is non-sinusoidal.

In case isolation of the input and output sides of the waveform generation system is desired, a waveform generation system with the arrangement shown in FIG. 3 may be used. Note that in this case, the input current is non-sinusoidal.

If isolation of the input and output of the sinusoidal waveform generation system is desirable, this can be done in various ways. One option for this purpose is to use the conventional approach and to employ an isolation transformer at mains frequency, before the rectifier (3) stage. In this case, the waveform generation system configuration is the same as that given in FIG. 1. Note that the input current is not sinusoidal in this configuration.

In case a sinusoidal input current is required, the waveform generation system configuration given in FIG. 2 following a mains frequency transformer may be employed. It must be emphasized that in the arrangements where a mains frequency transformer is employed, the size of the waveform generation system is large.

An embodiment of the present invention with isolation, but with non-sinusoidal input current thus comprises the steps:
employing a mains frequency transformer for isolation purposes,
rectifying the AC output of the transformer,
processing the rectified input; where, in order to produce the rectified form of the desired waveform, the rectified AC input is processed by a DC to DC step-down converter (5a), which provides full-wave rectified sinusoidal waveform or any desired waveform,
and inverting the processed waveform at zero-crossings.

or an embodiment of the present invention with isolation and with sinusoidal input current thus comprises the steps:
employing a mains frequency transformer for isolation purposes,
rectifying the AC output of the transformer, processing the rectified input; where, in order to produce the rectified form of the desired waveform, the rectified AC input is processed by a step-up DC to DC converter (21) which provides accommodation of sinusoidal input, followed by a DC to DC step-down converter (5a), which provides full-wave rectified sinusoidal waveform or any desired waveform,
and inverting the processed waveform at zero-crossings.

In case, size of the waveform generation system is a concern, the waveform generation system arrangement may be as shown in FIG. 3. Here, a single stage converter is used (5b), which provides both the isolation and produces an output in accordance with the reference voltage shape, magnitude and frequency defined by the user interface (8). In this arrangement however, the input side current is non-sinusoidal. The overall size of the waveform generation system in this topology is small because the isolation transformer employed in the DC to DC converter with isolation (5b) is a high frequency device.

The basic block diagram of this arrangement is depicted in FIG. 3. Again, the AC mains (2) is rectified by the rectifier (3). This is followed by the DC to DC converter with isolation (5b). The output (full-wave rectified bus) (10) of this converter (5b) is the rectified form of the desired waveform. The desired waveform is produced by the DC to DC converter with isolation (5b) which is controlled by the controller (7). In order to produce the appropriate gate control signals (14b) the controller (7) receives appropriate DC bus and full-wave rectified DC bus feedback signals (11,12) etc., from the DC bus (9) and the full-wave rectified bus (10). The DC to DC converter with isolation (5b) stage is followed by an inverter (6) which is responsible for inverting the full-wave rectified bus (10) voltage. As a consequence the desired AC output (15) is produced. The inverter's (6) switches operate at zero crossing of the full-wave rectified bus (10) voltage, and therefore, have low switching loss. The inverter gate control signals (25) are provided by the controller (7). The controller (7) continuously monitors the full-wave rectified bus (10) voltage and produces the inverter gate control signals (25) to facilitate zero voltage switching of the inverter's (6) transistors.

Hence a further embodiment of the waveform generation method for generating a desired waveform, with non-sinusoidal input current but with isolation is possible comprising the steps:
rectifying AC input,
processing the rectified input; where, in order to produce the rectified form of the desired waveform, the rectified AC input is processed by DC to DC converter (5b) which provides isolation and provides full-wave rectified sinusoidal waveform or any desired waveform,
and inverting the processed waveform at zero-crossings.

Figure 4:
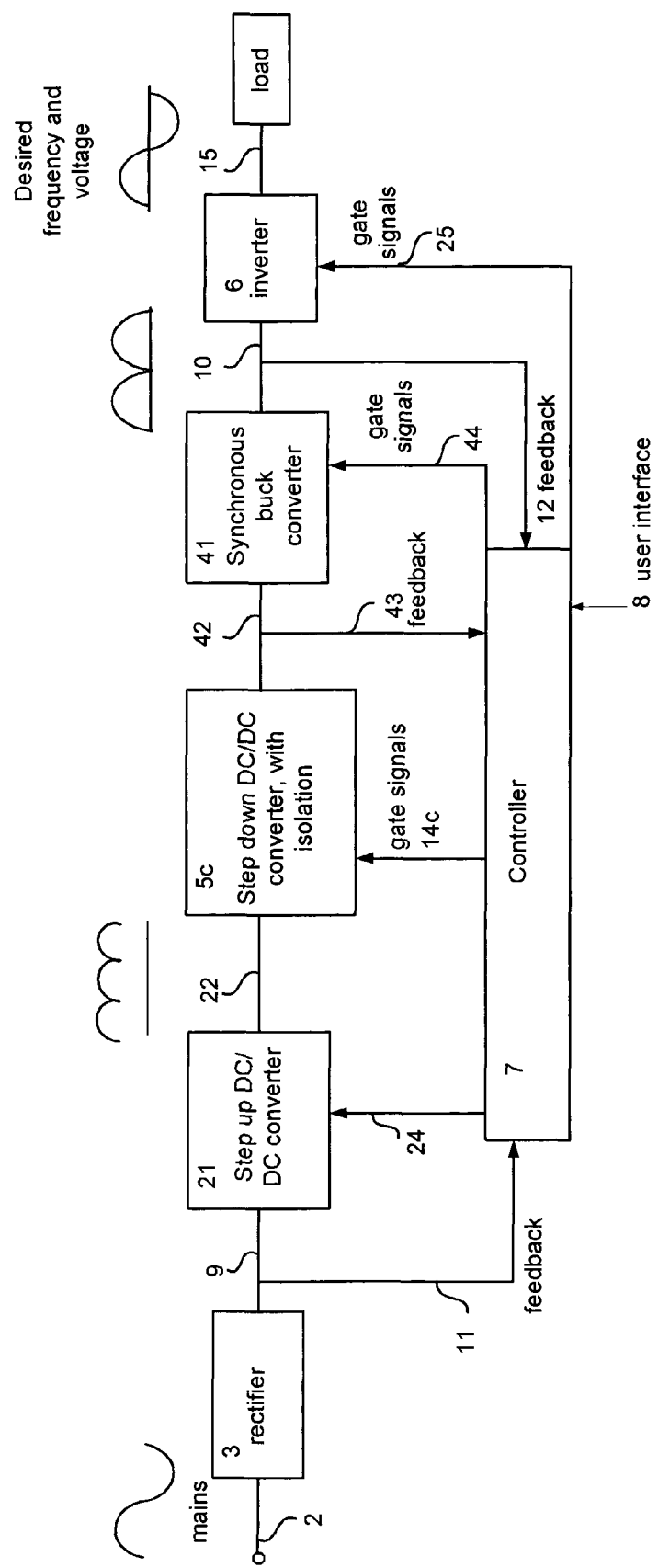
FIG. 4 is a functional block diagram of an isolated converter employing the invention with isolation, with unity power factor and sinusoidal input current and has variable frequency and amplitude AC output (15).

When both isolation of the load from the AC mains (2) side is desirable as well as a sinusoidal input current, a waveform generation system with the arrangement shown in FIG. 4 may be used. Here, since the isolation of the AC mains (2) side from the load is achieved via a step-down converter with isolation (5c), where the transformer is operated at a frequency much higher than the mains frequency, therefore the size of the transformer is small.

In this case the AC mains (2) voltage is rectified by the rectifier (3). The output of the rectifier (3) may be filtered if desired. The rectifier (3) stage is cascaded with a step-up DC to DC converter (21), which is responsible for obtaining a regulated DC bus (22) and making sure that the input current is sinusoidal. This stage is followed by a step-down (buck) DC to DC converter with isolation (5c). The output of (5c) is an intermediate regulated DC bus (42). Next block of the waveform generation system in FIG. 4 is responsible for obtaining a full-wave rectified waveform as specified by the user via the user interface (8). Said next block is a synchronous buck converter (41). The output of the synchronous buck converter (41) is the full-wave rectified bus (10). The full-wave rectified bus (10) voltage is inverted by the inverter (6) as in other possible applications of the invention. Bus (15), the output of the inverter (6) has the magnitude, shape and frequency defined by the user.

Stages of the waveform generation system in FIG. 4 are controlled by the controller (7), which receives DC bus feedback signal (11) from the DC bus (9) and receives the intermediate regulated DC bus feedback signals (43) from the intermediate regulated DC bus (42) as well as the full-wave rectified DC bus feedback signals (12) from the full-wave rectified bus (10) or any other desired parts of the waveform generation system. The controller (7) provides the gate control signals (24, 14c, 44, 25) for the step-up DC to DC converter (21), step-down DC to DC converter with isolation (5c) and also for the synchronous buck converter (41) and the inverter (6).

The controller (7) can be an electronic circuit or computer which, for obtaining the desired waveform under procession, can be preprogrammed, can employ a user interface (8) or a combination of both.

Hence an alternative embodiment of the waveform generation method for generating a desired waveform, with sinusoidal input current and with isolation is possible comprising the steps:
rectifying AC input,
processing the rectified input; where, in order to produce the rectified form of the desired waveform, the rectified AC input is processed by a step-up DC to DC converter (21) which provides accommodation of sinusoidal input, followed by a DC to DC step-down converter with isolation (5c) which provides isolation of the mains and the output, in turn followed by a synchronous buck converter (41) which provides full-wave rectified sinusoidal waveform or any desired waveform,
and inverting the processed waveform at zero-crossings.

In another embodiment of the invention, a two or three-phase AC output (15) can be obtained by incorporating two or three identical systems, coupled with a phase difference of 90° or 120° respectively and are synchronized by a general controller.

Specific applications of the invention are described above for illustration of the invention. It is contemplated, and will be apparent to those skilled in the art from the foregoing specification, drawings, and examples that modifications and/or changes may be made in the embodiments of the invention. Accordingly, it is expressly intended that the foregoing description and examples are illustrative of possible embodiments only, not limiting thereto, and that the true spirit and scope of the present invention be determined by reference to appended claims.

The invention claimed is:

1. A waveform generation method for generating a desired waveform, with isolation and with sinusoidal input current, comprising the steps:
rectifying AC input and as a result of this step generating a rectified waveform;
sending the rectified waveform to a step up DC to DC converter through a DC bus, wherein the step up DC to DC converter is capable of providing accommodation of sinusoidal input;
processing the rectified waveform via the step up DC to DC converter;
sending the processed waveform output from the step up DC to DC converter to a step down DC to DC converter with isolation through a regulated DC bus, wherein the step down DC to DC converter with isolation is capable of providing isolation of the mains and the output;
processing the processed waveform output from the step up DC to DC converter via the step down DC to DC converter with isolation;
sending the processed waveform output from the step down DC to DC converter with isolation to a synchronous buck converter through an intermediate regulated DC bus, wherein the synchronous buck converter is capable of providing full wave rectified sinusoidal waveform or any desired waveform;
processing the processed waveform output from the step down DC to DC converter with isolation via the synchronous buck converter;
sending the processed waveform output from the synchronous buck converter to an inverter; and
inverting the processed waveform at zero-crossings via the inverter.

2. The waveform generation method of claim 1 wherein the process is controlled by a controller; wherein the controller controls the process according to various feedback signals comprising the following steps:
receiving a voltage feedback signal from the DC bus;
sending a step up DC to DC gate control signal to the step up DC to DC converter;
sending a step down DC to DC converter with isolation gate signal to the step down DC to DC converter with isolation;
receiving an intermediate regulated DC bus feedback signal from the intermediate regulated DC bus;
sending a synchronous buck converter gate control signal to the synchronous buck converter;
receiving a full-wave rectified DC bus feedback signal from the full-wave rectified bus;
sending an inverter gate control signal to the inverter.

3. A waveform generation method for generating a desired waveform, without isolation and with non-sinusoidal input current, comprising the steps:
rectifying AC input and as a result of this step generating a rectified waveform;
sending the rectified waveform to a step down DC to DC converter through a DC bus;
processing the rectified waveform via the step down DC to DC converter; wherein the step down DC to DC converter is capable of providing full-wave rectified sinusoidal waveform or any desired waveform;

sending the processed waveform to an inverter through a full-wave rectified bus; and
inverting the processed waveform at zero-crossings via the inverter;
wherein a controller controls the steps according to various feedback signals comprising the following steps:
receiving a voltage feedback signal from the DC bus;
sending a reference signal to the step down DC to DC converter for controlling a shape, a magnitude and a frequency of an output of the step down DC to DC converter;
receiving a voltage measurement feedback signal from the full-wave rectified DC bus for adjusting the duty cycle of the step down DC to DC converter;
sending an inverter gate control signal to the inverter.

4. A waveform generation method for generating a desired waveform, without isolation but with sinusoidal input current, comprising the steps:
rectifying AC input and as a result of this step generating a rectified waveform;
sending the rectified waveform to a step up DC to DC converter through a DC bus, wherein the step up DC to DC converter is capable of providing accommodation of sinusoidal input;
processing the rectified waveform via the step up DC to DC converter;
sending the processed waveform output from the step up DC to DC converter to a step down DC to DC converter through a regulated DC bus;
processing the processed waveform output from the step up DC to DC converter via the step down DC to DC converter, wherein the step down DC to DC converter is capable of providing full-wave rectified sinusoidal waveform or any desired waveform;
sending the processed waveform output from the step up DC to DC converter to an inverter through a full-wave rectified bus; and
inverting the processed waveform at zero-crossings via the inverter;
wherein a controller controls the steps according to various feedback signals comprising the following steps:
receiving a voltage feedback signal from the DC bus;
sending a step up DC to DC gate control signal to the step up DC to DC converter for adjusting a plurality of switching devices;
receiving a regulated DC bus feedback signal from the regulated DC bus connected to the output of the step up DC to DC converter;
sending a step down DC to DC converter gate signal to the step down DC to DC converter;
sending a reference signal to the step down DC to DC converter for controlling a shape, a magnitude and a frequency of an output of the step down DC to DC converter;
receiving a voltage measurement feedback signal from the full-wave rectified DC bus for adjusting the duty cycle of the step down DC to DC converter;
sending an inverter gate control signal to the inverter.

5. A waveform generation method for generating a desired waveform, with isolation but with non-sinusoidal input current, comprising the steps:
employing a mains frequency transformer for isolation purposes;
rectifying the AC output of the transformer and as a result of this step generating a rectified waveform;
sending the rectified waveform to a step down DC to DC converter, wherein the step down DC to DC converter is capable of providing full-wave rectified sinusoidal waveform or any desired waveform;
processing the rectified waveform via the step down DC to DC converter in order to produce a desired rectified waveform;
sending the processed waveform from the step down DC to DC converter to an inverter through a full-wave rectified bus; and
inverting the processed waveform at zero-crossings via the inverter;
wherein a controller controls the steps according to various feedback signals comprising the following steps:
receiving a voltage feedback signal from the DC bus;
sending a reference signal to the step down DC to DC converter for controlling a shape, a magnitude and a frequency of an output of the step down DC to DC converter;
receiving a voltage measurement feedback signal from the full-wave rectified DC bus for adjusting the duty cycle of the step down DC to DC converter;
sending an inverter gate control signal to the inverter.

6. A waveform generation method for generating a desired waveform, with isolation and with sinusoidal input current, comprising the steps:
employing a mains frequency transformer for isolation purposes;
rectifying the AC output of the transformer and as a result of this step generating a rectified waveform;
sending the rectified waveform to a step up DC to DC converter through a DC wherein the step up DC to DC converter is Capable of providing accommodation of sinusoidal input;
processing the rectified waveform via the step up DC to DC converter;
sending the processed waveform output from the step up DC to DC converter to a step down DC to DC converter through a regulated DC bus;
processing the processed waveform output from the step up DC to DC converter via the step down DC to DC converter, wherein the step down DC to DC converter is capable of providing full-wave rectified sinusoidal waveform or any desired waveform;
sending the processed waveform output from the step up DC to DC converter to an inverter through a full-wave rectified bus; and
inverting the processed waveform at zero-crossings
wherein a controller controls the steps according to various feedback signals comprising the following steps:
receiving a voltage feedback signal from the DC bus;
sending a step up DC to DC gate control signal to the step up DC to DC converter for adjusting, a plurality of switching devices;
receiving a regulated DC bus feedback signal from the regulated DC bus connected to the output of the step up DC to DC converter;
sending a step down DC to DC converter gate signal to the step down DC to DC converter;
sending a reference signal to the step down DC to DC converter for controlling a shape, a magnitude and a frequency of an output of the step down DC to DC converter;
receiving a voltage measurement feedback signal from the full-wave rectified DC bus for adjusting the duty cycle of the step down DC to DC converter;
sending an inverter gate control signal to the inverter.

* * * * *